United States Patent Office 3,642,629
Patented Feb. 15, 1972

3,642,629
CHEMICAL COMPOUNDS AND COMPOSITIONS
Donald R. Randell, Stockport, England, assignor to Geigy Chemical Corporation, Ardsley, N.Y.
No Drawing. Division of application Ser. No. 753,321, Apr. 26, 1968, now Patent No. 3,536,706, which is a division of application Ser. No. 526,401, Feb. 10, 1966, now Patent No. 3,414,618, which in turn is a division of application Ser. No. 431,709, Feb. 10, 1965. Divided and this application Jan. 27, 1970, Ser. No. 6,308
Claims priority, application Great Britain, Feb. 11, 1964, 5,593/64; Feb. 29, 1964, 8,579/64
Int. Cl. C10m 1/38, 1/34
U.S. Cl. 252—47.5                     7 Claims

ABSTRACT OF THE DISCLOSURE

Chemical compositions are composed of synthetic lubricant and antioxidant compound of the formula:

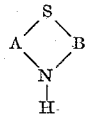

wherein A and B are the same or different and each is an aryl group, and one of the aryl groups A and B contains a tertiary alkyl substituent group having from 4 to 12 carbon atoms.

---

This application is a division of application Ser. No. 753,321, filed Apr. 26, 1968, now U.S. Pat. 3,536,706, which is in turn a division of application Ser. No. 526,401, filed Feb. 10, 1966, now U.S. Pat. 3,414,618, which application is in turn a division of application Ser. No. 431,709, filed Feb. 10, 1965, now abandoned.

The present invention relates to synthetic lubricant compositions containing antioxidants.

It is known that dialkylated derivatives of conventional antioxidant systems such as diphenylamine and phenothiazine, and synergistic combinations thereof, may be used as antioxidants in ester-based synthetic lubricants, and that these dialkylated derivatives do not have the disadvantage of bringing about the formation of oil-insoluble products in synthetic lubricants at high temperatures, which is encountered if phenothiazine itself is used. It was found that the requirements of standard test specifications could be met by incorporating dialkylated phenothiazine and dialkylated secondary amines, thus avoiding the so-called "phenothiazine dirtiness."

However, with the advent of gas turbine engines required to propel aircraft at greater speeds, has come a demand for lubricants which will function satisfactorily at still higher temperatures, at which lubricant compositions comprising the previously suggested dialkylated compounds do not pass the requirements of standard specification tests. For instance, the requirements of the Pratt and Whitney Type II oxidation-corrosion tests, carried out at 425° or 450° F. for 48 hours cannot be met by lubricants containing dialkylated derivatives of diphenylamine and phenothiazine.

It is an object of the present invention to provide improved compositions of synthetic lubricants containing improved antioxidants.

Accordingly, the present invention provides compositions containing a mono-tertiary alkyl heterocyclic compound having the formula:

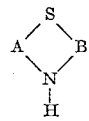

wherein A and B are the same or different and each is an aryl group, and one of the aryl groups A and B contains a tertiary alkyl substituent group having from 4 to 12 carbon atoms.

Each of the aryl groups A and B may be, for example, a benzene or naphthalene nucleus otherwise unsubstituted or containing further substituents, apart from the tertiary alkyl group which is necessarily present in one of groups A and B; if either or both of the groups A and B is a naphthalene residue, this may be a 1:2- or a 2:1-substituted naphthalene residue. The tertiary alkyl group may be, for example, tertiary butyl (1':1'-dimethylethyl), tertiary pentyl (1':1'-dimethylpropyl), tertiary hexyl (1':1'-dimethylbutyl), tertiary octyl (1':1':3':3'-tetramethylbutyl) or tertiary dodecyl (1':1':3':3':5':5'-hexamethylhexyl).

The tertiary alkyl substituent group advantageously contains from 6 to 10 carbon atoms. The tertiary alkyl substituent preferably has a tertiary carbon atom directly attached to the aryl nucleus of which the alkyl group is a substituent.

If the aryl group A or B which contains the essential tertiary alkyl substituent is an unsubstituted or substituted phenyl group, the tertiary alkyl group is preferably in the 4-position relative to the carbon atom of the benzene ring directly attached to the nitrogen of the secondary amine grouping. If the aryl group A or B which contains the tertiary alkyl substituent is an otherwise unsubstituted or substituted naphthyl group, the tertiary alkyl group is preferably attached in the same or the analogous positions as the 4-substituent in a phenyl group. These preferred structures may be represented as follows, wherein R represents the tertiary alkyl group and wherein the aryl nuclei may be otherwise unsubstituted (as shown) or substituted:

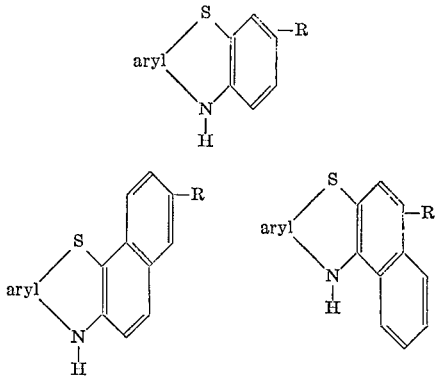

the aryl (R) group in each instance being an unsubstituted or substituted 1:2- or 2:1-naphthalene residue or, preferably, a benzene residue.

Examples of such phenothiazine compounds therefore include 3-tertiary butyl phenothiazine, 3-tertiary pentyl phenothiazine, 3-tertiary octyl phenothiazine, 3-tertiary dodecyl phenothiazine, and analogues thereof wherein one or both of the benzene rings is replaced by a 1:2- or 2:1-substituted naphthalene residue.

The mono-tertiary alkyl substituted phenothiazine compounds are produced, for example, by thionating the corresponding mono-alkyl substituted diarylamine compound. The thionation can be carried out by reacting the mono-alkyl-substituted diarylamine compound with elemental sulphur, at an elevated temperature, and preferably at a temperature in the range of from 100° to 250° C. If desired, the reaction can be conducted in the presence of an organic solvent inert under the reaction conditions, for instance xylene. The reaction of the mono-alkyl-substituted diarylamine compound with sulphur can be carried out, if desired, in the presence of iodine or other thionation catalyst. The mono-alkyl-substituted diarylamine compound is preferably reacted with two atomic proportions of sulphur per molar proportion of the diarylamine compound. If desired, the mono alkylated phenothiazine compound can be isolated from the reaction mixture by conventional means, for example by crystallization. The mono tertiary alkyl diarylamine used to produce the mono tertiary alkyl phenothiazine compounds can be prepared, for example, by contacting the corresponding diarylamine with a 1- or 2-alkylene, the total number of carbon atoms in the molecule of the alkylene being from 4 to 12. In general, the 1- or 2-alkylenes react to produce the same mono tertiary alkyl diarylamine. For example, isopentene (consisting mainly of 2-methylbutene-1), di-isobutylene (a mixture of 2:4:4-trimethylpentene-1 and 2:4:4-trimethylpentene-2) propylene dimer (consisting mainly of 2-methylpentene-1) and tri-isobutylene (a mixture of 2:4:4:6:6-pentamethylheptene-1 and 2:4:4:6:6-pentamethylheptene-2) can be reacted with a diarylamine starting material to produce the mono-(1':1'-dimethylpropyl)-diarylamine, mono-(1':1':3':3'-tetramethylbutyl)-diarylamine, mono-(1'-dimethylbutyl)-diarylamine and mono-(1':1':3':3':5':5'-hexamethylhexyl)-diarylamine, respectively.

The reaction with the alkylene can be carried out by heating the reactants together at an elevated temperature, preferably at a temperature in the range of from 100° to 250° C., and is preferably conducted under substantially anhydrous conditions. The reaction is advantageously effected in the presence of a Friedel-Crafts catalyst, for instance in the presence of aluminum chloride. The desired mono alkylated compound can be isolated from the reaction mixture, and if desired purified, by conventional means, for example by fractional distillation or crystallization.

The mono tertiary alkyl diarylamine can also be produced by contacting the corresponding diarylamine with a corresponding tertiary alkyl halide, for instance a tertiary alkyl chloride. The reaction can be carried out by heating the reactants together at an elevated temperature, preferably in the range of from 25° to 50° C. and is preferably conducted under substantially anhydrous conditions. The reaction is advantageously effected in the presence of a Friedel-Crafts catalyst, for instance in the presence of aluminum chloride. The mono tertiary alkyl diarylamine can be isolated from the reaction mixture and if desired purified, by conventional means, for example, by fractional distillation or crystallization.

The synthetic lubricant is preferably a synthetic lubricant based on one or more organic carboxylic acid esters; intended for use at an operating temperature at or above 400° F. Examples of such synthetic lubricants include lubricants based on a diester of a dibasic acid and a monohydric alcohol, for instance dioctyl sebacate or dinonyl adipate; on a triester of trimethylolpropane and a monobasic acid or mixture of monobasic acids, for instance trimethylolpropane tripelargonate or trimethylolpropane tricaprylate; on a tetraester of pentaerythritol and a monobasic acid or mixture of monobasic acids, for instance pentaerythritol tetracaprylate; or on complex esters derived from monobasic acids, dibasic acids and polyhydric alcohols; or on mixtures thereof.

The compositions of the invention may, if desired, also contain other constituents. For instance one or more load carrying additives, viscosity index improvers or pour-point depressants of conventional type for lubricants may be present. If desired, a metal deactivator may also be present in the composition: for example, benzotriazole or a copper-protecting derivative of benzotriazole may be present preferably in a concentration within the range of from 0.01% to 1% by weight based on the total weight of the composition.

The proportion of antioxidant present in the lubricant compositions of the invention can be varied within wide limits. The compositions of the present invention may, for instance, contain from 0.1% to 10% by weight of antioxidant and preferably from 1.5% to 4% by weight based on the total weight of the composition.

The following examples further illustrate the present invention. Parts by weight shown therein bear the same relation to parts by volume as do kilograms to liters. Percentages shown are expressed by weight unless otherwise stated.

EXAMPLE 1

(A) 169.2 parts by weight of diphenylamine were heated with 140.3 parts by weight of di-isobutylene (a mixture of 75% of 2:4:4-trimethylpentene-1 and 25% of 2:4:4-trimethylpentene-2) and with 2.2 parts by weight of anhydrous aluminum chloride for 15 hours while maintaining the temperature within the range of from 108° to 146° C.

The product was a mixture of 4- and 4:4'-tertiary octyl diphenylamines with unreacted diphenylamine. The desired 4-tertiary octyl diphenylamine was separated from the other constituents of the reaction product by fractional distillation and was recrystallized from aqueous ethanol.

The 4-tertiary octyl diphenylamine thus obtained had melting point 48° to 49° C. and boiling point 150° to 154° C. at 0.22 millimeter of mercury pressure. The conversion achieved was 55%.

(B) 84.4 parts by weight of 4-tertiary octyl diphenylamine, produced by the procedure described in Example 1A, were heated with 10.2 parts by weight of sulphur for 20 hours while maintaining the temperature within the range of from 200° to 220° C. The reactants were heated until the rate of evolution by hydrogen sulphide was very slow.

The crude reaction product was crystallized from petroleum ether (boiling point range 60° to 80° C.) to produce 3-tertiary octyl phenothiazine, having melting point 118° C. and the following elemental analysis:

Calculated ($C_{20}H_{26}NS$) (percent): C, 77.11; H, 8.10; N, 4.50; S, 10.14. Found (percent): C, 76.82; H, 8.07; N, 4.54; S, 10.29. The yield was 72% theoretical.

EXAMPLE 2

(A) 657 parts by weight of N-phenyl-α-naphthylamine were heated with 673 parts by weight of di-isobutylene (having the same composition as that used in Example 1), and 6.6 parts by weight of anhydrous aluminum chloride for 26 hours, while maintaining the temperature at 108° to 136° C.

The product was N-p-tertiary octyl-phenyl-α-naphthylamine, having melting point 76° to 77° C. and the following elemental analysis:

Calculated ($C_{24}H_{29}N$) (percent): C, 86.96; H, 8.82; N, 4.23. Found (percent): C, 86.94; H, 8.82; N, 4.05. The yield was 62% theoretical.

(B) 109.4 parts by weight of N-p-tertiary octyl-phenyl-α-naphthylamine, produced by the procedure described in Example 2A were dissolved in 200 parts by volume of xylene and the solution was heated with 21.5 parts by weight of sulphur and 1.1 parts by weight of iodine as thionation catalyst. The mixture was heated at 148° C. for 24 hours.

The thionation product was 9-tertiary octyl 12H-benzo-[a]-phenothiazine, having melting point 147° to 148° C. and the following elemental analysis:

Calculated ($C_{24}H_{27}NS$) (percent): C, 79.73; H, 7.53; N, 3.88; S, 8.87. Found (percent): C, 79.35; H, 7.60; N, 3.96; S, 8.93. The yield was 56% theoretical.

EXAMPLE 3

(A) The procedure described as Example 2A carried out using 219.3 parts by weight of N-phenyl-β-naphthylamine instead of the N-phenyl-α-naphthylamine, the reaction conditions being otherwise the same.

The product was N-p-tertiary octyl-phenyl-β-naphthylamine, having melting point 126° C. and the following elemental analysis:

Calculated ($C_{24}H_{29}N$) (percent): C, 86.96; H, 8.82; N, 4.23. Found (percent): C, 87.18; H, 8.84; N, 4.40. The yield was 53% theoretical.

(B) The procedure described in Example 2B was carried out using 87.5 parts by weight of N-p-tertiary octyl-phenyl-β-naphthylamine, produced by the procedure described in Example 3A, instead of the N-tertiary octyl-phenyl-α-naphthylamine, the reaction conditions being otherwise the same except that the reaction temperature was maintained in the range of from 210° to 220° C.

The thionation product was 10-tertiary octyl-7H-benzo-[c]-phenothiazine, having melting point 140° C. and the following elemental analysis:

Calculated ($C_{24}H_{27}NS$) (percent): C, 79.73; H, 7.53; N, 3.88; S, 8.87. Found (percent): C, 79.91; H, 7.57; N, 4.02; S, 8.66. The yield was 73% theoretical.

EXAMPLES 4 TO 6

Synthetic ester-based lubricant compositions were prepared into which were incorporated a mono-tertiary alkyl phenothiazine and subjected to an oxidation-corrosion test. The base fluid in each of the tests was trimethylolpropane tripelargonate and each test was carried out for 6 hours at 260° C. (500° F.) with dry air at the rate of 5 liters per hour in the presence of two mild steel specimens having ¾ inch outside diameter and 5/16 inch inside diameter (British standard specification No. 3).

To each lubricant sample had been added 1.5% by weight of a mono-tertiary alkyl-substituted compound in accordance with the invention, based on the total weight of the lubricant composition.

The results of the tests are given in Table I. In this table the final acid value is expressed as milligrams of potassium hydroxide per gram; the sludge is expressed as milligrams; and the weight change of the steel specimens is expressed as milligrams per square centimeter. Included in the table are the results of comparative tests carried out under the same conditions but with no additive and with compounds as additives which are other than those of the present invention.

The results in Table I demonstrate the ability of the monoalkylated compounds to provide protection to the lubricant oil without the production of oil insolubles and magnesium attack. The dialkylated derivatives used in the comparative tests described inhibit the production of sludge but cause heavy corrosion of magnesium, as shown hereafter.

TABLE I

| Example | Additive | Percent additive | Percent viscosity increase at 100° F. | Final acid value | Sludge | Weight change of steel specimens |
|---|---|---|---|---|---|---|
| | None | | 31.7 | 9.9 | 16 | +0.08:+0.07 |
| | Phenothiazine | 1.0 | 12.9 | 3.7 | 617 | +0.11:+0.16 |
| | Iminodibenzyl | 1.0 | 4.4 | 3.5 | (1) | +0.22:+0.19 |
| | Diphenylamine | 1.0 | 9.5 | 4.4 | 343 | +0.08:+0.28 |
| | Di-tertiary octyl-phenothiazine | 2.0 | 14.9 | 8.0 | 11 | +0.63:+0.71 |
| | N-phenyl-α-naphthylamine | 1.0 | 9.2 | 4.5 | 274 | +0.07:+0.12 |
| | 4:4'-tertiary octyl-diphenylamine | 2.0 | 19.4 | 6.7 | 10 | +0.65:+0.55 |
| 4 | 10-tertiary octyl-7H benzo[c]phenothiazine | 1.5 | 14.8 | 5.9 | 1 | +0.10:+0.12 |
| 5 | 9-tertiary octyl-12-benzo[a]phenothiazine | 1.5 | 24.2 | 7.3 | 24 | +0.12:+0.12 |
| 6 | 3-tertiary octyl-phenothiazine | 1.5 | 12.9 | 6.6 | 4 | +0.03:+0.02 |

1 Moderate.

EXAMPLES 7 TO 9

Synthetic ester-based lubricant compositions were produced and subjected to the Pratt & Whitney Type II oxidation-corrosion test. The base fluid was pentaerythritol tetracaprylate and each test was carried out for 48 hours at 425° F. with dry air at the rate of 5 liters per hour and in the presence of specimens of magnesium alloy, aluminum alloy, copper, silver and steel.

To each lubricant sample had been added to proportions of a phenothiazine-type additive and benzotriazole as stated in Table II.

The results of the tests are given in Table II which includes comparisons where no additive or an additive other than a monoalkylated compound of the present invention was present. In the table, the acid value increase is expressed as milligrams of potassium hydroxide per gram; the sludge is expressed in milligrams; and the weight change of the specimens as milligrams per square centimeter.

TABLE II

| Example | Additive | Percent additive | Percent viscosity increase at 100° F. | Acid value increase | Sludge | Weight change of specimens | | | | |
|---|---|---|---|---|---|---|---|---|---|---|
| | | | | | | Mg alloy | Al alloy | Cu | Ag | Steel |
| | None | | 246.2 | 11.5 | 21.3 | −19.80 | +0.03 | +0.65 | +0.03 | +0.03 |
| | Phenothiazine | 2.0 | 30.2 | 5.8 | 376.5 | +0.14 | +0.07 | −0.22 | +0.18 | +0.08 |
| | Iminodibenzyl | 2.0 | 12.0 | 2.0 | 294.9 | +0.14 | +0.06 | −0.30 | +0.10 | Nil |
| | Diphenylamine | 2.0 | 35.4 | 3.8 | 80.2 | −4.75 | Nil | −0.69 | +0.01 | Nil |
| | N-phenyl-α-naphathylamine | 2.0 | 26.5 | 3.4 | 50.9 | +0.03 | +0.07 | +1.57 | +0.03 | +0.04 |
| | N-phenyl-β-naphthylamine | 2.0 | 23.9 | 3.3 | 20.0 | +0.03 | Nil | −0.83 | +0.08 | +0.06 |
| | 3:7-di-tertiary octylphenothiazine and benzotriazole | 4.0; 0.5 | 40.6 | 5.61 | 3.0 | −0.41 | −0.01 | −0.62 | −0.03 | −0.01 |
| | 2:8-di-tertiary octyliminodibenzyl and benzotriazole | 4.0; 0.5 | 27.0 | 3.2 | 5.8 | −3.79 | Nil | −1.09 | −0.04 | −0.04 |
| | 4:4'-di-tertiary octyldiphenylamine and benzotriazole | 4.0; 0.5 | 35.5 | 3.8 | 2.8 | −3.83 | −0.01 | +0.44 | +0.04 | +0.01 |
| 7 | 3-tertiary octylphenothiazine and benzotriazole | 3.0; 0.5 | 47.6 | 5.0 | 1.6 | −0.09 | −0.01 | −0.28 | −0.04 | +0.03 |
| 8 | 4-tertiary octyldiphenylamine and benzotriazole | 3.0; 0.5 | 37.5 | 3.0 | 3.0 | −0.20 | −0.02 | −0.15 | −0.01 | +0.01 |
| 9 | 10-tertiary octyl-7H-benzo-(c)-phenothiazine and benzotriazole | 3.0; 0.5 | 40.7 | 8.1 | 2.0 | −0.67 | −0.01 | −0.79 | −0.03 | −0.02 |

EXAMPLE 10

Synthetic ester-based lubricant compositions were produced and subjected to the Pratt & Whitney Type II oxidation-corrosion test. The base fluid was pentaerythritol tetracaprylate and each test was carried out for 48 hours at 450° F. with dry air at the rate of 5 liters per hour and in the presence of specimens of magnesium alloy, aluminum alloy, copper, silver and steel.

To each lubricant sample had been added the proportions of a phenothiazine type additive and benzotriazole as stated in Table III.

The results of the tests are given in Table III which includes comparisons where no additive or an additive other than a monoalkylated compound of the present invention was present.

In the table, the acid value increase is expressed as milligrams of potassium hydroxide per gram; the sludge is expressed in milligrams; and the weight change of the specimens as milligrams per square centimeter.

The results in Table III demonstrate the effectiveness of the specified monoalkylated compound of this invention and its superior properties over related compounds not monoalkylated.

TABLE III

| Example | Additive | Percent additive | Percent viscosity increase at 100° F. | Acid value increase | Sludge | Weight change of specimens |||||
|---|---|---|---|---|---|---|---|---|---|---|
| | | | | | | Mg alloy | Al alloy | Cu | Ag | Steel |
| | None | | (¹) | (¹) | (¹) | (²) | −0.01 | −0.14 | +0.03 | −1.48 |
| | Phenothiazine | 2.0 | (¹) | (¹) | (¹) | −2.86 | +0.09 | 0.66 | +0.13 | +0.22 |
| | 3:7-di-tertiary octyl phenothiazine and benzotriazole | 4.0; 0.5 | 71.7 | 20.6 | (³) | −56.90 | +0.01 | −0.34 | Nil | Nil |
| 10 | 3-tertiary octylphenothiazine and benzotriazole | 3.0; 0.5 | 78.1 | 4.1 | 2.0 | −0.15 | −0.01 | −0.36 | −0.03 | +0.02 |

¹ Determinations impossible due to excessive polymerization.
² Completely corroded.
³ Not filterable.

Having thus disclosed the invention, what is claimed is:

1. A composition comprising lubricating amounts of a carboxylic acid ester lubricating oil and, antioxidant amounts of mono tertiary alkyl substituted compound having the formula:

wherein A and B are the same or different and each is a member selected from the group consisting of phenylene and napthylene, and one of the aryl groups A and B is unsubstituted and the other contains a single tertiary alkyl substituent group of from 4 to 12 carbon atoms.

2. A composition according to claim 1, said composition also containing benzotriazole as metal deactivator.

3. A composition according to claim 1, wherein the synthetic lubricant is di-2-ethylhexyl sebacate.

4. A composition according to claim 1, wherein the synthetic lubricant is trimethylolpropane tripelargonate.

5. A composition according to claim 1, wherein the synthetic lubricant is pentaerythritol tetracaprylate.

6. A composition according to claim 1, wherein the synthetic lubricant is complex ester derived from trimethylolpropane, caprylic acid and sebacic acid.

7. A composition according to claim 1, wherein the mono tertiary alkyl substituted compound is a member selected from the group consisting of 3-tertiarybutylphenothiazine,
3-tertiarypentyl(1':1'-dimethylpropyl)phenothiazine,
3-tertiaryhexyl(1':1'-dimethylbutyl)phenothiazine,
3-tertiaryoctyl(1:1:3:3-tetramethylbutyl)phenothiazine,
3-tertiarydodecyl(1:1:3:3:5:5-hexamethylhexyl)-phenothiazine,
9-tertiaryoctyl-12H-benzo-[a]-phenothiazine, and
10-tertiaryoctyl-7H-benzo-[c]-phenothiazine.

References Cited
UNITED STATES PATENTS 3,218,256  11/1965  Edwards et al. _____ 252—47.5

DANIEL E. WYMAN, Primary Examiner

W. H. CANNON, Assistant Examiner

U.S. Cl. X.R.

252—402